United States Patent [19]

Puski et al.

[11] 3,950,564

[45] Apr. 13, 1976

[54] PROCESS OF MAKING A SOY-BASED MEAT SUBSTITUTE

[75] Inventors: Gabor Puski, Hanover Park; Arthur H. Konwinski, Melrose Park, both of Ill.

[73] Assignee: Central Soya Company, Inc., Fort Wayne, Ind.

[22] Filed: Aug. 2, 1974

[21] Appl. No.: 494,099

[52] U.S. Cl............................. 426/516; 426/802
[51] Int. Cl.².......................................... A23J 3/00
[58] Field of Search ............ 426/802, 656, 506, 516

[56] References Cited
UNITED STATES PATENTS 3,814,823   6/1974   Yang et al. ..................... 426/656 X Primary Examiner—A. Louis Monacell
Assistant Examiner—R. A. Yoncoskie
Attorney, Agent, or Firm—Dawson, Tilton, Fallon & Lungmus

[57] ABSTRACT

A process for preparing a soy-based meat substitute characterized by relatively flat, elongated, generally longitudinally aligned fibrous masses having the appearance of stacked platelets which simulate the compactness, chewiness and texture of meat; achieved by extrusion of a soy protein-containing source material at higher moisture content and lower temperature (as contrasted to prior art), minimizing expansion with reduction of pressure in the extruder in a somewhat stepwise fashion by modifying the extruder so as to allow more shearing action and to allow space for alignment of fibrous masses.

3 Claims, 3 Drawing Figures

PROCESS OF MAKING A SOY-BASED MEAT SUBSTITUTE

BACKGROUND AND SUMMARY OF INVENTION

Considerable work has been done during the last decade or so in providing vegetable protein substitutes for meat, particularly using soy protein source material. Early efforts were devoted to the development and commercialization of meat substitutes derived from spun soy protein fibers. More recent effort has been devoted to developing a more economical route to meat substitutes through the extrusion processing of proteinaceous material, particularly defatted soy flour. This latter work is exemplified by the showing and description in U.S. Pat. No. 3,488,770 which teaches an extruded product made from defatted soy flour and having an open cell, plexilamellar structure. Even though this product, which is now commercially available as a meat substitute, contains the requisite nutritional protein, it is characterized by an unsatisfactory mushiness in texture, particularly in heat processed meat foods and most particularly in retorted canned meat foods. Thus, this existing art has not provided an entirely acceptable meat substitute. Therefore, it is the principal object of this invention to provide a meat substitute of requisite nutritional value, yet one which avoids the mushy textural character of the prior art extrusion product and provides instead an elongated fibrous mass-like structure more simulative of meat.

The present invention concerns a novel process for the extrusion of proteinaceous materials such as defatted oil seed protein flours and concentrates and mixtures thereof and containing at least 40% protein on a moisture-free basis. Examples of suitable proteinaceous materials include defatted flours and concentrates derived from soybeans, peanuts, cottonseed, sesame seed and the like. In particular, defatted soy flours and concentrates are most suitable.

In order to obtain an extruded proteinaceous product which simulates the textural characteristics of meat, particularly when heat processed in food product preparation, we discovered that modification of a conventional extruder as described in prior art is necessary. As an example of a conventional extruder, we used a Wenger X-25 extrusion device with the modifications described in the following detailed description. However, it should be understood that the practice of this invention is not limited to this particular extrusion device as long as the extruder is suitable for the modification as specified.

DETAILED DESCRIPTION OF THE INVENTION

Figure 1:
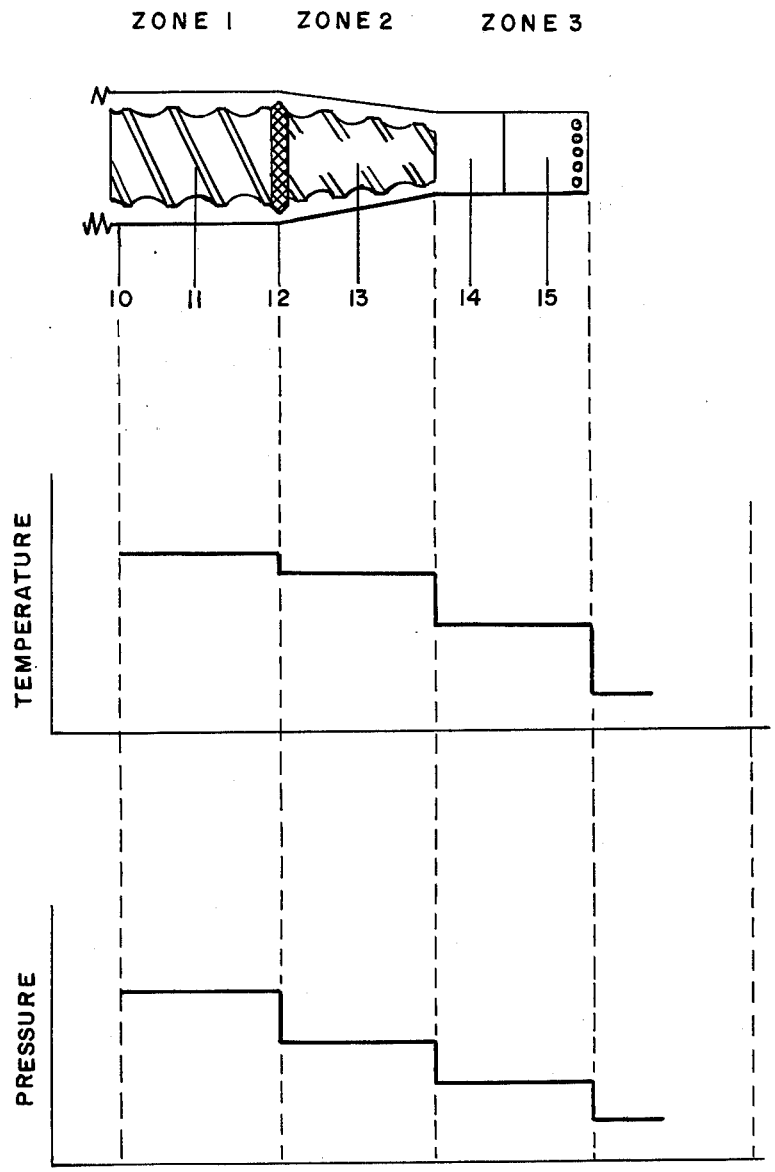
Figure 2:
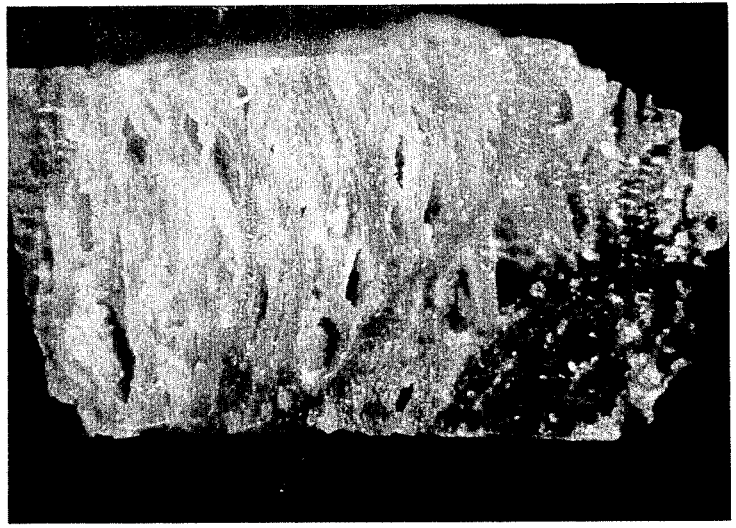
Figure 3:
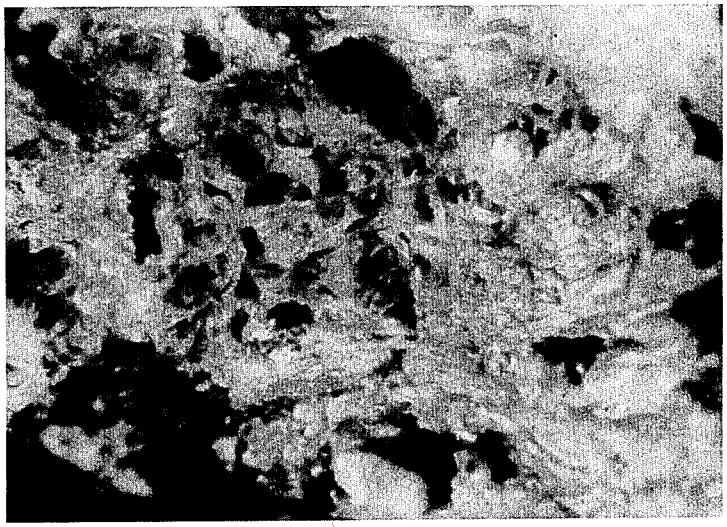

This invention is described in conjunction with the accompanying drawing in which:

FIG. 1 is a composite schematic presentation of a portion of an extruder partially in section and having shown therebelow graphs of temperature and pressure profiles;

FIG. 2 is a photomicrograph of about 60 times magnification of a longitudinally sectioned textured soy flour product produced according to the instant invention; and FIG. 3 is a similarly magnified photomicrograph of a section of defatted soy flour produced by the inventors hereof according to the teachings of the aforementioned U.S. Pat. No. 3,488,770.

In the practice of this invention, we made the following modifications in the extruder design, particularly in the configuration of the extruder screw in the section preceding the die through which the proteinaceous mass is forced by working of the screw within the confines of the extruder barrel. Referring to FIG. 1, we enlarged the diameter of the "steamlock" or barrier 12, which is placed between the tapered screw 13 and the screw section 11, immediately preceding it. This limits the cross-sectional area between the inside surface of the extruder barrel 10 and the steamlock 12. This restricts the flow of the material being extruded in Zone 1 and allows for higher pressure and shearing action. Secondly, we relieved portions of the screw thread as by notching in the final screw section, i.e., the tapered or cone section 13. This results in a slowing down of the flow of material in this section (Zone 2) of the extrusion device and thus permits a greater shearing action or working of the proteinaceous mass progressing through the extruder. This modification also serves as the first step in the generally stepwise reduction of pressure within the extruder barrel. Since the cross-sectional area available to material flow is enlarged by such notching, there is a reduction in pressure accompanied by very limited expansion of the material being worked upon. Thirdly, we added an extended spacer 14 between the terminal end of the tapered screw 13 and the adjacent face of the die 15. It will be noted that there is no screw placed in this section (Zone 3) of the extruder barrel. This allows for the laminar flow of material with alignment of the proteinaceous fibrous masses in the direction of flow. This plays an important role in obtaining the relatively compact fibrous nature of the final extruded proteinaceous product as contrasted to the non-fibrous, spongelike product described in the art. The cross-sectional area available to material flow is increased in this section-resulting in further reduction in pressure.

We have found, through experimentation, that in order to achieve the objective of this invention, Zone 3 should have a cross-sectional area to length ratio of less than about 10 square inches per inch of length to produce a product having the aforementioned desirable characteristics.

As shown in FIG. 1, due to the aforementioned modification of the extrusion device, we have set up a generally stepwise reduction in pressure from the highest pressure in Zone 1 (in front of the enlarged steamlock) to the lowest pressure following Zone 3 (atmospheric pressure). In fact, the pressure drop across the orifice of the die is less than 100 pounds per square inch (psi) and is about of the order of 70–80 psi. This was found to be an important factor in achieving the limited expansion of the emerging product desired for a meat-like texture.

The prior art, e.g., cited in U.S. Pat. No. 3,488,770 states that the pressure drop across the die orifice must be higher than 100 psi, and preferably in the range of 250 to 900 psi. Such a high one-step pressure drop produces the less desirable, spongy, mushy texture which characterizes the product of the prior art.

Another significant factor involved in the preferred embodiment of this invention is the control of the moisture content of the proteinaceous material that is worked through the extrusion device. Contrary to expectation, based on a reading of the prior art, we have discovered that the density and compaction of the extruded product are enhanced with the addition of sufficient water to the proteinaceous material to result in a mixture containing at least 30% moisture. A suitable upper value is about 60%.

Although the mechanism by which this invention produces a product with desirable meat-like characteristics is imperfectly understood, it is believed that the higher moisture content of the proteinaceous mixture, e.g., dry defatted soy flour and water, being acted upon in the extrusion device makes possible for superior shearing action so as to develop relatively compact meat-like protein fibrous masses or strands as contrasted to the expanded protein strands of the prior art. As depicted in FIG. 1, this is facilitated by the lower temperature and pressure, particularly in the zones adjacent to the extrusion die. The reduction of the annular spacing between adjacent screw sections creates a greater residence time for the hot thermoplastic mass in each screw section of the barrel thereby permitting the auger or screw device to work the mass and create more elongated fibrous mass, platelet-like structures in the ultimate extrudate. These are then further worked in the final notched tapered screw or cone section of the extruder and then aligned in the important open section of the barrel just ahead of the extrusion die. The combination of these factors, i.e., higher moisture content of the proteinaceous mass, lower temperature, more shearing action, open space within the extruder barrel to allow fibrous mass orientation and generally stepwise reduction in pressure, results in a more meat-like texture in the finished product. This product is characterized by relatively flat, elongated generally longitudinally aligned fibrous masses suggestive of stacked platelets which simulate the compactness of meat.

Reference is next made to FIG. 2 which shows the product produced according to the instant invention. It will be noted that, particularly in contrast to FIG. 3 there is little, if any, open spaces (air micelles) present between the planar layers. To the extent that they are present, the air micelles appear as thin elongated spaces, the diameter of which is less than about 0.2 millimeters. Further, under a magnification of the order of about 250 times, there are no more than about 3 of these micelles per square millimeter. This is in distinct contrast to the pronounced "honey comb" or sponge-like appearance of the prior art material. It will be noted that the ratio of solid to open spaces is about 20 to 1 in the product of the instant invention as seen in FIG. 2 and we prefer that less than 25% of the product volume are voids.

The practice of the invention can be better understood from a consideration of specific examples thereof, and, for that purpose, the following is set down.

EXAMPLE I

For comparison purposes, two runs were performed in this example, one which yielded a prior art product (of the open cell, plexilamellar structure) and another one according to our invention. In each case, an X-25 extruder manufactured by Wenger Manufacturing Company of Sabetha, Kan. was employed. There were seven screw sections, i.e., augers, arranged along the length of the extruder barrel, the last (immediately before the die) being tapered and having the envelope of a frustum of a cone. Between each of the screw sections there was positioned a so-called "steamlock" which consisted of a cylindrical collar on the screw or auger shaft aligned with a cylindrical shoulder on the inside of the extruder barrel. The cooperation of the collars and their respective or corresponding shoulders developed a series of annuli through which the fluid mass passed in going from an upstream screw section to a screw section more downstream.

To produce the prior art product, viz., that with the open cell plexilamellar structure, we extruded a mixture of defatted soy flour having a protein content of about 50% (dry basis) and water to provide a moisture content of 30%, and with the extruder operated according to U.S. Pat. No. 3,488,770. The resultant product had the structure present in FIG. 3.

For the second run, to follow the teachings of the instant invention, in addition to increasing the moisture concentration of the soy flour mixture to 50%, and lowering the temperature of the jacket section immediately adjacent the die to 185°F, we modified the extruder to provide the generally stepwise reduction of pressure, and increased shearing action. This was done in three ways. A 1 ⅜ inch spacer was inserted between the terminal end of the tapered screw and the adjacent face of the die to allow orientation and fiber formation before extruding through the die. Secondly, we relieved portions (as by notching) of the screw thread in the final screw section, i.e., the tapered or cone screw. This provided additional space for shearing activity. Thirdly, we reduced the cross-sectional area of the last annulus, i.e., the clearance formed between the "steamlock" and the inside wall of the extruder barrel preceding it. These three steps also provide a generally stepwise reduction of pressure, which is important in controlling the expansion of the product as it comes out of the die orifice. The resulting product possessed a structure as presented in FIG. 2, and was characterized by superior textural qualities as compared to that produced by the first run and as represented in FIG. 3. The extruded product can be dried in any known manner to 6-10% moisture content, then rehydrated just before use to give a meat-like textured product.

EXAMPLE II

The products of Example I were reproduced, but with the addition of appropriate seasoning, flavors, coloring matter added to the defatted soy flour before extrusion. The differences noted between the product produced according to the cited prior art and the present invention were the same as in Example I, namely the present invention produced a more compact meat-like structure characterized by less mushiness when hydrated and cooked for use.

EXAMPLE III

In this example, the runs of Example I were repeated but with a change in starting material. In this case, instead of using defatted soy flour, we employed soy protein concentrate, i.e., a processed soy protein product which had approximately 70% or more protein ($N \times 6.25$) on a moisture-free basis. Soy protein concentrate is prepared from high quality selected soybeans which are sound and clean. The bean hull is removed, the cotyledon is cracked, flaked, and the oil is extracted by commercial hexane after which the solvent is separated and the residual solvent is eliminated from insoluble residue by flash evaporation or similar conventional means. The dry product is obtained in the shape of flakes which are then extracted with aqueous alcohol, e.g., 60–80% ethanol, to separate the carbohydrates, certain minerals and other soluble constituents from the insoluble matter. After this, the product is desolventized, dried and ground to obtain the final soy protein concentrate. Again, the difference in the two extrusion runs was the same as in Example I. As with the defatted soy flour of Example I, the products were considerably different, approaching in structure that shown in FIG. 2 for the inventive product while the other run also using soy protein concentrate but following the prior art resulted in a product like that shown in FIG. 3. The texture of the product made with soy concentrate was more chewy and meat-like as compared with the product made with defatted soy flour.

EXAMPLE IV

In this example, the procedure of Example I was used to extrude a 50—50 mixture of defatted soy flour and soy protein isolate. The soy protein isolate contained approximately 90% protein and was prepared from defatted mildly desolventized soybean flakes. The flakes were mixed with a mildly alkaline aqueous solution to extract the soluble proteins, carbohydrates, and mineral constituents from the insoluble matter. The protein-containing extract was separated from the residual matter of the flakes and was acidified to pH 4.6 with hydrochloric acid so as to precipitate the major globulin fraction of the protein which, in turn, was separated by centrifugation. The resulting curd was washed with water, dispersed at pH 7.0 with a solution of sodium hydroxide, and then spray dried.

With the mixture of soy flour and soy protein isolate, utilizing the same conditions of the two comparative runs of Example I, like results were obtained, viz., the product made with the instant invention produced a product similar to that of FIG. 2 whereas the product made according to U.S. Pat. No. 3,488,770 produced a product similar to that shown in FIG. 3.

EXAMPLE V

For this example, a comparison test was performed utilizing two runs. In this instance, the starting material was a 50—50 mixture of soy protein isolate and soy protein concentrate. The results again showed that the process of the instant invention provided a product superior in textural properties.

After hydration, the extrusion product not only had a texture and fiber structure similar to that of red meat, but was also similar to that of fish and poultry. The product can withstand processing without losing its textural qualities, as was not the case with textured soy protein products prepared according to the prior extrusion art. The blandness of the product enhances its ability to be appropriately flavored, and the product is readily amenable to being colored to simulate various meat items. Further, the taste of the product can be improved by boiling the product prior to drying, if such is required. The product can be battered, breaded, and fried to give a seafood-like product.

Not only is the product produced according to the instant invention texturally similar to meat, but is formulatable into savory meat-type products, as can be seen from the ensuing examples.

EXAMPLE VI

For this example, a "Sloppy Joe" type product was prepared. "Sloppy Joe" is a colloquial term for a spiced and seasoned ground meat in tomato sauce food item. For this purpose, the product produced according to Example I and under the conditions of the present invention and having a density somewhat in excess of 20 pounds per cubic foot was used in the following formulation to make a Sloppy Joe mix:

| Ingredients | Percentage By Weight |
|---|---|
| Meat Substitute soy product | 35.00% |
| Water | 17.50 |
| Beef broth | 15.00 |
| Tomato paste | 12.50 |
| Sugar | 4.50 |
| Wheat Flour | 4.50 |
| Vinegar | 2.50 |
| Spices, flavors | 8.50 |
| | 100.00% |

The sauce ingredients were blended in a steam-jacketed kettle and heated to 180°F., after which the meat substitute soy product was blended therein. The resultant "meat" in sauce was introduced into cans. The cans were closed and thermally processed at 250°F. for 65 minutes. The product exhibited a meat-like texture in appearance and mouth-feel after thermal processing.

EXAMPLE VII

The extruded soy protein product used in Example VI was used herein to provide a poultry substitute in the form of "chicken a la king", according to the following formulation:

| Ingredients | Percentage By Weight |
|---|---|
| Extruded protein product | 22.00% |
| Vegetables | 7.00 |
| Water | 58.50 |
| Chicken fat | 4.50 |
| Starch | 2.40 |
| Nonfat dry milk | 2.40 |
| Wheat flour | 1.20 |
| Spices, flavors | 2.00 |
| | 100.00% |

In the preparation of the "chicken a la king", the ingredients for the sauce were blended in a steam-jacketed kettle by heating to 180°F. The extruded protein and vetables were placed in a heavy aluminum foil pan, and the sauce poured into the pan, after which the ingredients were mixed. The pan was then covered and frozen. The product exhibited surprising "meat-like" texture in appearance and taste upon oven reconstitution at 400°F for 60 minutes.

EXAMPLE VIII

For "chicken" soup, the same extrudate was employed along with chicken flavored concentrate, spices, flavor and water. The relative concentration of ingredients was:

| Ingredients | Percentage By Weight |
|---|---|
| Protein extrudate | 2.00% |
| Chicken flavored concentrate | 2.00 |
| Noodles | 12.80 |
| Spices, flavors | 0.05 |
| Water | 83.07 |
| | 100.00% |

These ingredients were mixed to form a soup and cans were filled with the soup and closed. Then the cans were thermally processed at 250°F for 65 minutes. The product resulting therefrom exhibited typical chicken soup characteristics with meat-like chunks.

In all of the foregoing examples, it was found that the extruded soy protein would not only withstand boiling, but even further, would withstand retorting conditions. This is in studied contrast to the textured soy protein previously available from extrusion processing. However, the inventive product is by no means a compacted or expelled product, but is a dense fibrous product. These examples serve to illustrate the nature of our invention, but practice of this invention is not limited thereto.

WE claim:

1. A process of making a soy-based meat substitute comprising the steps of introducing into an extruder an aqueous protein mix comprising a protein material obtained from a solvent extracted oilseed proteinaceous material having at least 40% protein on a dry basis, said protein mix having the water adjusted prior to extrusion to achieve a mix having 30% to 60% water content during extrusion, passing said protein mix through a plurality of pressure and temperature zones of decreasing value with the final zone prior to passing through a shaping die having a pressure less than 100 psi and a temperature less than 212°F with said final zone being characterized by a cross-sectional area to length ratio of less than about 10 square inches per inch to provide a product having relatively flat elongated generally longitudinally aligned densely compacted protein fibers having the appearance of stacked platelets with greater than 0% but less than about 25% of the product volume being voids and with said voids having the general contour of said platelets.

2. The process of claim 1 in which said protein material is defatted soy flour.

3. The process of claim 1 in which said protein material is soy protein concentrate.

* * * * *